United States Patent [19]
Nishisu et al.

[11] Patent Number: 5,413,736
[45] Date of Patent: May 9, 1995

[54] PARTICULATE FLUORESCENT MATERIAL OF $(Y_{1-x}\ Eu_x)_2O_3$ AND PROCESS OF PREPARING SAME

[75] Inventors: Yoshihiro Nishisu; Mikio Kobayashi, both of Tsukuba, Japan

[73] Assignee: Director-General of Agency of Industrial Science & Technology, Japan

[21] Appl. No.: 196,432

[22] Filed: Feb. 15, 1994

[30] Foreign Application Priority Data

Mar. 22, 1993 [JP] Japan .................................. 5-086822

[51] Int. Cl.$^6$ ............................................. C09K 11/77
[52] U.S. Cl. .............................. 252/301.4 R; 423/263
[58] Field of Search .................. 252/301.4 R; 423/263

[56] References Cited

U.S. PATENT DOCUMENTS

| | | | |
|---|---|---|---|
| 3,457,184 | 7/1969 | Kobayashi et al. | 252/301.4 R |
| 3,484,381 | 12/1969 | Yale et al. | 252/301.4 R |
| 3,582,493 | 6/1971 | Haynes et al. | 252/301.4 R |
| 5,015,452 | 5/1991 | Matijevic | 252/301.4 R |

OTHER PUBLICATIONS

Preparation of Spherical, Monosized $Y_2O_3$ Precursor Particles Journal of Colloid & Interface Science, vol. 122 1 Mar. 1988.

*Primary Examiner*—Mark L. Bell
*Assistant Examiner*—C. M. Bonner
*Attorney, Agent, or Firm*—Lorusso & Loud

[57] ABSTRACT

A fluorescent material is disclosed which includes substantially spherical particles each consisting of $Y_2O_3$ and $Eu_2O_3$ and having an average particle diameter of 90–210 nm and a narrow particle size distribution. The fluorescent material may be produced by heating an aqueous solution having a pH of 3 or less and containing a yttrium salt, a europium salt and urea at a temperature of at least 90° C. to coprecipitate $YOHCO_3$ and $EuOHCO_3$ as particles having an average particle diameter of 110–270 nm. The resulting particles are then calcined at a temperature of at least 600° C. to form spheres each consisting of $Y_2O_3$ and $Eu_2O_3$.

4 Claims, No Drawings

PARTICULATE FLUORESCENT MATERIAL OF $(Y_{1-x} Eu_x)_2O_3$ AND PROCESS OF PREPARING SAME

BACKGROUND OF THE INVENTION

1. Field of the Invention

This invention relates to a particulate fluorescent material formed of a mixture of yttrium oxide and europium oxide and to a process of preparing same.

2. Description of the Related Art

A mixture of yttrium oxide and europium oxide is utilized as a fluorescent material such as for a fluorescent paint. One known method for the production of such a fluorescent material includes the steps of blending a yttrium compound with a europium compound, calcining the blend to form a mixture of yttrium oxide and europium oxide, fusing the mixture to obtain a homogeneous admixture, and grinding the admixture, after cooling, into particles. The fluorescent material of the thus obtained particles has a problem because the particles are not uniform in size and are not spherical in shape. Thus, a paint using such a fluorescent material fails to give a smooth coating.

Sordelet et al propose a method for the preparation of spherical, monosized yttrium oxide particles in which an aqueous yttrium nitrate solution containing urea is heated to precipitate $YOHCO_3$ particles, the resulting $YOHCO_3$ particles being subsequently calcined to obtain the spherical yttrium oxide particles (Journal of Colloid and Interface Science, vol. 122, No. 1, pages 47-59, March (1988)).

A process is also known in which an aqueous europium compound solution containing urea is heated to precipitate $EuOHCO_3$ particles which are convertible to europium oxide particles by calcination.

SUMMARY OF THE INVENTION

It is, therefore, an object of the present invention to provide uniform spherical particles of a mixture of yttrium oxide and europium oxide having a narrow particle size distribution.

Another object of the present invention is to provide a particulate fluorescent material capable of emitting a high intensity sharp fluorescence.

It is a further object of the present invention to provide a process which can produce spherical particles of a mixture of yttrium oxide and europium oxide having a narrow particle size distribution.

In accomplishing the foregoing objects, the present invention provides a fluorescent material which comprises substantially spherical particles each consisting of $Y_2O_3$ and $Eu_2O_3$, said particles having an average particle diameter of 90-210 nm and such a particle size distribution that the particle diameters of more than 99% by weight of said particles fall within the range of $D \pm 50$ nm where D stands for said average particle diameter.

In another aspect, the present invention provides a process for the production of a fluorescent material which includes the steps of:

providing an aqueous solution having a pH of 3 or less and containing a yttrium salt, a europium salt and urea;

heating said solution at a temperature of at least 90° C. to coprecipitate $YOHCO_3$ and $EuOHCO_3$ as particles having an average particle diameter of 110-270 nm and such a particle size distribution that more than 99% by weight of said particles have particle diameters of $D \pm 50$ nm; and calcining said particles at a temperature of at least 600° C. to form spheres each consisting of $Y_2O_3$ and $Eu_2O_3$.

When an aqueous yttrium compound solution and an aqueous europium compound solution are separately heated in the presence of urea under the same conditions, the particle size of the precipitated $YOHCO_3$ particles is about three times as large as that of the precipitated $EuOHCO_3$ particles. It has been unexpectedly found that when an aqueous solution containing the both compounds is reacted with urea, $EuOHCO_3$ and $YOHCO_3$ are coprecipitated as particles with a uniform particle size.

Other objects, features and advantages of the present invention will become apparent from the detailed description of the preferred embodiments of the invention to follow.

DETAILED DESCRIPTION OF THE PREFERRED EMBODIMENTS OF THE INVENTION

In the process according to the present invention, an aqueous solution having a pH of 3 or less and containing a yttrium salt, a europium salt and urea is first prepared.

As the yttrium salt, a yttrium halide, such as yttrium chloride ($YCl_3$), or yttrium nitrate ($Y(NO_3)_3$) is preferably used. As the europium salt, a europium halide, such as europium chloride ($EuCl_3$), or europium nitrate ($Eu(NO_3)_3$) is preferably used. Other salts may be used as long as they are soluble in water at a pH of 3 or less. The amount of the yttrium compound relative to that of the europium compound is not specifically limited and is suitably selected according to the end use. Generally, the yttrium and europium compounds are used in such an amount as to provide an atomic ratio Y/Eu of 1:0.001 to 1:0.2, namely such an amount that the fluorescent material produced has a composition of $(Y_{1-x}, Eu_x)_2O_3$ wherein x is a number of between 0.001 and 0.2. The pH of the aqueous solution is adjusted to 3 or less, generally 2-3, by addition of an acid such as hydrochloric acid, nitric acid, sulfuric acid.

Dissolved in the aqueous acid solution is urea which serves to function as a precipitant. The amount of urea is generally 10-100 moles, preferably 20-80 moles, per mole of a total of the yttrium and europium compounds.

The aqueous acidic solution is reacted at a temperature of at least 90° C., preferably 95°-98° C. to coprecipitate $YOHCO_3$ and $EuOHCO_3$. The reaction is generally continued until the pH of the reaction mixture increases to 7 or more, preferably 7.5-8.5. The precipitates are separated from the reaction mixture by filtration, centrifuge or the like solid-liquid separation method and washed several times with water by, for example, a combination of dispersion into water by an ultrasonic method with solid-liquid separation.

The thus obtained precipitates are then dried to obtain particles each consisting of a mixture of $YOHCO_3$ and $EuOHCO_3$ and having an average particle diameter of generally 110-270 nm, and such a particle size distribution that more than 99% by weight of the particles have particle diameters of $D \pm 50$ nm. Before the drying step, it is preferred that the wet particles obtained in the water-washing step be dispersed in an organic solvent such as an alcohol, followed by solid-liquid separation, to substitute the organic solvent for the impregnated water, since otherwise the wet particles tend to agglomerate during the drying.

The particles of a mixture of $YOHCO_3$ and $EuOHCO_3$ are then calcined at a temperature of at least 600° C., preferably 700°–1,000° C., to form spheres each consisting of $Y_2O_3$ and $Eu_2O_3$. The calcination may be performed in air. The thus obtained spherical particles have an average particle diameter of 90–210 nm, preferably 100–180 nm and such a particle size distribution that the particle diameters of more than 99% by weight of the particles fall within the range of $D\pm50$ nm where D stands for the average particle diameter. By excitation with ultraviolet light, the particles of the present invention fluoresce.

The following example will further illustrate the present invention.

EXAMPLE

Preparation of Particles of $YOHCO_3$ and $EuOHCO_3$

Into 900 ml of pure water were dissolved $YCl_3 \cdot 6H_2O$, $EuCl_3 \cdot 6H_2O$ and urea in the amounts shown in Table 1 below, and the solution was adjusted to pH 2.5 with hydrochloric acid and allowed to stand at room temperature for 24 hours. The solution was then heated at 97° C. for 1 hour. As a result, the pH of the reaction solution was increased to 8.5 and precipitates were formed. The precipitates were separated by centrifuge and dispersed in water for washing. Such separation and dispersion treatments were repeated four times.

The washed precipitates were separated from the aqueous dispersion by centrifuge and dispersed into isopropanol by an ultrasonic method. The precipitates were then separated, dispersed in isopropanol and separated in the same manner as above, and dried to obtain dried particles. The chemical analysis reveals that the particles are formed of a mixture of $YOHCO_3$ and $EuOHCO_3$. The transmission microscope reveals that the particles have an average particle size as shown in Table 1. The particles of each of Experiment Nos. 1–4 shown in Table 1 were found to have such a particle distribution that the difference in particle size between the largest and smallest particles was 90 nm or less.

TABLE 1

| Experiment No. | Concentration ($10^{-2}$ mole/liter) | | | Average Particle Diameter (nm) |
|---|---|---|---|---|
| | $YCl_3$ | $EuCl_3$ | Urea | |
| 1 | 0.80 | 0.20 | 50 | 140 |

TABLE 1-continued

| Experiment No. | Concentration ($10^{-2}$ mole/liter) | | | Average Particle Diameter (nm) |
|---|---|---|---|---|
| | $YCl_3$ | $EuCl_3$ | Urea | |
| 2 | 0.85 | 0.15 | 50 | 185 |
| 3 | 0.90 | 0.10 | 50 | 217 |
| 4 | 0.95 | 0.05 | 50 | 264 |

Preparation of Particles of $Y_2O_3$ and $Eu_2O_3$:

The dried particles of a mixture of $YOHCO_3$ and $EuOHCO_3$ obtained in each of Experiments Nos. 1–4 above were calcined at 850° C. for 1 hour in air to obtain spherical particles having average particle diameters of within the range of 90–210 nm and each consisting of a mixture of $Y_2O_3$ and $Eu_2O_3$. When irradiated with a UV light having a wavelength of 254 nm, the particles emit strong, red fluorescence having a wavelength of 611 nm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the production of a fluorescent material comprising the steps of:
    providing an aqueous solution having a pH of 3 or less and containing a yttrium salt, a europium salt and urea;
    heating said solution at a temperature of at least 90° C. to precipitate particles, each of said particles consisting of a mixture of $YOHCO_3$ and $EuOHCO_3$, said particles having an average particle diameter of 110–270 nm and such a particle size distribution that more than 99% by weight of said particles have particle diameters of $D\pm50$ nm; and
    calcining said particles at a temperature of at least 600° C. to form spheres, each sphere having the composition $(Y_{1-x}, Eu_x)_2O_3$ wherein x is 0.001–0.2.

2. The process of claim 1 wherein said heating is at a temperature of 95°–98° C.

3. The process of claim 2 wherein said heating is continued until the pH of the reaction mixture increases to at least 7.

4. The process of claim 1 wherein said heating is continued until the pH of the reaction mixture increases to at least 7.

* * * * *

UNITED STATES PATENT AND TRADEMARK OFFICE
CERTIFICATE OF CORRECTION

PATENT NO. : 5,413,736
DATED : May 9, 1995
INVENTOR(S) : NISHISU et al

It is certified that error appears in the above-indentified patent and that said Letters Patent is hereby corrected as shown below:

Title page, item [54]:
"$Y_{1-x}"EU_x$" should read --$Y_{1-x'}Eu_x$--.

Col. 1, line 2, "$Y_{1-x}"EU_x$" should read --$Y_{1-x'}Eu_x$--.

Col. 2, line 5, "Eu2O$_3$" should read --$Eu_2O_3$--;

line 40, "$Y_{1-x,}$" should read --$Y_{1-x'}$--.

Col. 4, line 44, "0 001-0.2" should read --0.001-0.2--.

Signed and Sealed this

Seventeenth Day of October, 1995

Attest:

BRUCE LEHMAN

*Attesting Officer*     Commissioner of Patents and Trademarks